United States Patent [19]

Lee et al.

[11] Patent Number: 5,041,509
[45] Date of Patent: Aug. 20, 1991

[54] SIDE CHAIN COPOLYMERS EXHIBITING NONLINEAR OPTICAL RESPONSE

[76] Inventors: Cherylyn Lee, 384 Penns Way, Baskingridge, Somerset Cty., N.J.; Diane Allen, Apt. 58 Tudor Ct., Springfield, Union Cty., N.J.; Ronald N. DeMartino, 11 Mandeville Dr., Wayne, Passaic Cty., N.J.; Walton, Connie R., 401 Rt. 22 West, Apt. 32B,, No. Plainfield, Somerset Cty., N.J.; Brian B. Marr, 316 Whispering Way, Annadale, Hunterdon Cty., N.J.; Jane E. Edwardsen, 788 Stenton Ct., Trenton, Mercer Cty., N.J.

[21] Appl. No.: 477,267

[22] Filed: Feb. 7, 1990

[51] Int. Cl.$^5$ .......................... F21V 9/00; G02B 5/02

[52] U.S. Cl. .................................. 526/243; 526/245; 526/265; 526/259; 526/320; 526/326; 526/328.5; 526/329.4; 526/329.6; 526/310; 526/311; 526/312; 252/582

[58] Field of Search ............... 526/245, 243, 265, 259, 526/326, 320, 328.5, 329.4, 329.6, 310, 311, 312

[56] References Cited

U.S. PATENT DOCUMENTS 4,913,844  4/1990  DeMartino .......................... 526/259

Primary Examiner—Paul R. Michl
Assistant Examiner—T. McDonald, Jr.

[57] ABSTRACT

This invention provides novel side chain copolymers which exhibit nonlinear optical response, and which have utility as a transparent optical component in all-optical and electrooptical light switch and light modulator devices.

An invention side chain copolymer is illustrated by the following structure:

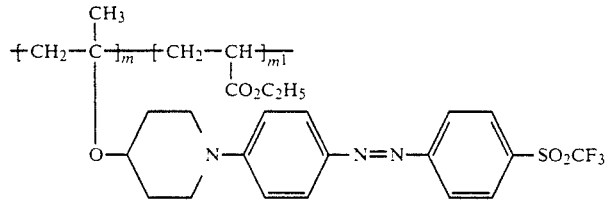

9 Claims, No Drawings

SIDE CHAIN COPOLYMERS EXHIBITING NONLINEAR OPTICAL RESPONSE

CROSS-REFERENCE TO RELATED PATENT APPLICATIONS

The present patent application has subject matter related to the disclosure of copending patent application Ser. No. 148,262, filed Jan. 25, 1988, U.S. Pat. No. 4,913,844; patent application Ser. No. 156,051, filed Feb. 16, 1988, U.S. Pat. No. 4,826,950; and patent application Ser. No. 477,283, filed Feb. 7, 1990.

BACKGROUND OF THE INVENTION

Polymers with a comb structure of pendant side chains are a new class of organic materials which exhibit interesting optical properties.

Comb-like liquid crystalline polymers are described in Eur. Polym. J., 18, 651 (1982); Advanced Polymer Science, Liquid Crystal Polymers II/III, Springer-Verlag, New York (1984), pages 215–220; and in U.S. Pat. Nos. 4,293,435 and 4,631,328. The disclosed polymeric structures have been developed for their mesogenic optical properties which have prospective utility in opto-electronic display devices.

In U.S. Pat. Nos. 4,694,066; 4,755,574; and 4,762,912 liquid crystalline polymers are described which have pendant side chains which exhibit nonlinear optical susceptibility, in addition to mesogenic properties. U.S. Pat. No. 4,792,208 discloses nonlinear optically responsive organic compounds and side chain polymers in which the molecular dipoles have an electron donor moiety linked through a conjugated bonding system to an electron acceptor sulfonyl moiety. Japanese patent 88175834 discloses an acrylate polymer which has nitro(ethylhydroxyethylamino)azobenzene side chains.

Nonlinear optical properties of organic and polymeric materials was the subject of a symposium sponsored by the ACS division of Polymer Chemistry at the 18th meeting of the American Chemical Society, September 1982. Papers presented at the meeting are published in ACS Symposium Series 233, American Chemical Society, Washington, D.C. 1983.

Thin films of organic or polymeric materials with large second order nonlinearities in combination with silicon-based electronic circuitry have potential as systems for laser modulation and deflection, information control in optical circuitry, and the like.

Other novel processes occurring through third order nonlinearity such as degenerate four-wave mixing, whereby real-time processing of optical fields occurs, have potential utility in such diverse fields as optical communications and integrated circuit fabrication.

Liquid crystalline side chain polymers which exhibit nonlinear optical properties are suitable for application as a nonlinear optical component in optical light switch and light modulator devices. One disadvantage of a liquid crystalline side chain polymer optical medium is a loss of transmission efficiency due to light scattering by deviations from ideal mesogenic order.

There is continuing interest in the theory and practice of optically responsive polymers which are characterized by an oriented state of comb-like side chain structures.

There is also an increasing research effort to develop new nonlinear optical organic systems for prospective novel phenomena and devices adapted for laser frequency conversion, information control in optical circuitry, light valves and optical switches. The potential utility of organic materials with large second order and third order nonlinearities for very high frequency application contrasts with the bandwidth limitations of conventional inorganic electrooptic materials.

Accordingly, it is an object of this invention to provide novel optically responsive monomers and polymers.

It is another object of this invention to provide acrylic copolymers having side chains which exhibit nonlinear optical response.

It is a further object of this invention to provide optical light switch and light modulator devices with a transparent polymeric nonlinear optical component comprising a thin film of an acrylic copolymer with nonlinear optically-responsive pendant side chains which can be uniaxially oriented by an external field.

Other objects and advantages of the present invention shall become apparent from the accompanying description and examples.

DESCRIPTION OF THE INVENTION

One or more objects of the present invention are accomplished by the provision of an isotropic acrylic copolymer which is characterized by recurring monomeric units corresponding to the formula:

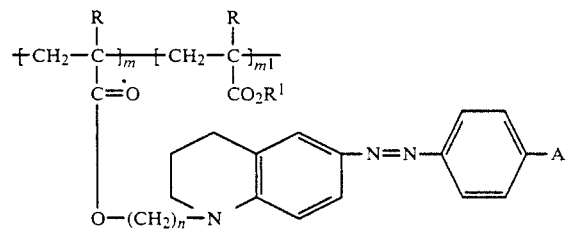

where R is hydrogen or a $C_1$–$C_4$ alkyl substituent; $R^1$ is a $C_1$–$C_6$ alkyl substituent; m and $M^1$ are integers which total at least 10; n is an integer between about 1–20; and A is —CN, —$NO_2$, —CH=C(CN)$_2$, —C(CN)=C(CN)$_2$, —$SO_2CF_3$,

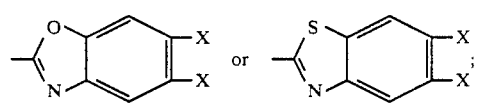

and X is —H, —CN, —$NO_2$ or —$CF_3$.

In another embodiment this invention provides an isotropic acrylic copolymer which is characterized by recurring monomeric units corresponding to the formula:

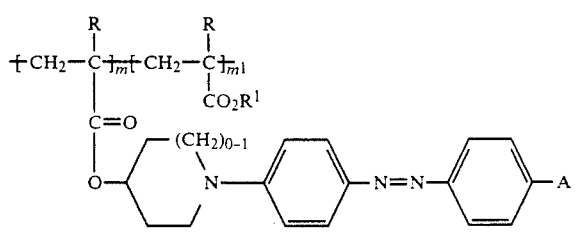

where R is hydrogen or a $C_1$–$C_4$ alkyl substituent; $R^1$ is a $C_1$–$C_6$ alkyl substituent; m and $m^1$ are integers which total at least 10; and A is —CN, —NO$_2$, —CH=C(CN)$_2$, —C(CN)=C(CN)$_2$, —SO$_2$CF$_3$,

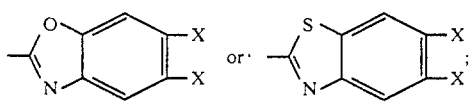

and X is —H, —CN, —NO$_2$ or —CF$_3$.

In another embodiment this invention provides an isotropic acrylic copolymer which is characterized by recurring monomeric units corresponding to the formula:

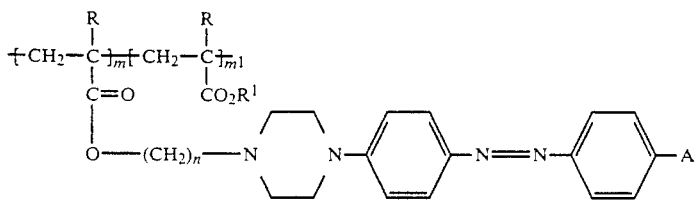

where R is hydrogen or a C$_1$-C$_4$ alkyl substituent; R$^1$ is a C$_1$-C$_6$ alkyl substituent; m and m$^1$ are integers which total at least 10; n is an integer between about 1-20; and A is —CN, —NO$_2$, —CH=C(CN)$_2$, —C(CN)=C(CN)$_2$, —SO$_2$CF$_3$,

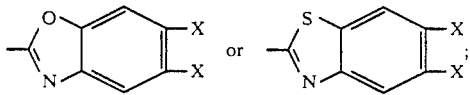

and X is —H, —CN, —NO$_2$ or —CF$_3$.

A typical copolymer of the present invention has a weight average molecular weight in the range between about 5000-200,000, and a glass transition temperature in the range between about 40°-150° C.

A present invention copolymer has pendant side chains which exhibits nonlinear optical susceptibility β. A copolymer can be formed into a nonlinear optical medium, such as a transparent film or coating on a substrate. A copolymer can be applied to a supporting substrate by conventional means, such as spin coating, spraying, Langmuir-Blodgett deposition, and the like.

A film or coating fabricated with a present invention copolymer exhibits third order nonlinear optical susceptibility.

A nonlinear optical medium of the present invention can be subjected to an external field to uniaxially orient the copolymer side chains. In one method the polymer medium is heated close to or above the copolymer glass transition temperature T$_g$, then an external field (e.g., a DC electric field) is applied to the medium of mobile copolymer molecules to induce uniaxial molecular alignment of copolymer side chains parallel to the applied field, and the medium is cooled while maintaining the external field effect.

By this method a present invention nonlinear optical medium has a stable uniaxial alignment of copolymer side chains. The poled optical medium exhibits a second nonlinear optical susceptibility $\chi^{(2)}$. A present invention poled optical medium is capable of exhibiting a $\chi^{(2)}$ level of $2 \times 10^{-8}$ esu or higher as measured at 1.34 μm excitation wavelength.

In another embodiment this invention provides an optical light switch or light modulator device which contains a polymeric nonlinear optical component comprising a transparent solid medium of an isotropic acrylic copolymer with pendant side chains having a structure as described hereinabove.

In a present invention optical light switch or light modulator device, the polymeric nonlinear optical component exhibits less than about 10 percent scattering of transmitted incident light waves.

The term "transparent" as employed herein refers to a polymeric optical medium which is transparent or light transmitting with respect to incident fundamental and created light frequencies. In a present invention optical device, the copolymeric thin film nonlinear optical medium component is transparent to both the incident and exit light frequencies.

The term "isotropic" as employed herein refers to a transparent copolymeric optical medium in which the optical properties are equivalent in all tensor directions.

The term "external field" as employed herein refers to an electric, magnetic or mechanical stress field which is applied to a substrate of mobile copolymer molecules, to induce dipolar alignment of the copolymer molecules parallel to the field.

A present invention optical device can be a laser frequency converter, an optical Kerr effect device, an electrooptical Kerr effect device, a degenerate four wave mixing device, an optical interferometric waveguide gate, a wide-band electrooptical guided wave analog-to-digital converter, an all-optical multiplexer, an all-optical demultiplexer, an optical bistable device, an optical parametric device, and the like, as described in U.S. Pat. No. 4,775,215.

The theory of nonlinear harmonic generation by frequency modulation of coherent light is elaborated by A. F. Garito et al in Chapter 1, "Molecular Optics:Nonlinear Optical Properties Of Organic And Polymeric Crystals"; ACS Symposium Series 233 (1983).

An optical interferometric waveguide gate device is described by A. Lattes et al in IEEE J. Quantum Electronics, QE-19(11), 1718 (1983).

A wide-band electrooptical guided-wave analog-to-digital converter device is described by R. A. Becker et al in Proceedings Of The IEEE, 72(7), 802 (1984).

Optical multiplexer-demultiplexer devices are described in U.S. Pat. Nos. 3,532,890; 3,755,676; 4,427,895; 4,455,643; and 4,468,776.

Optical bistable devices are described in U.S. Pat. Nos. 4,515,429 and 4,583,818; and by P. W. Smith et al in Applied Physics Letters, 30(6); 280 (1977) and in IEEE Spectrum, June 1981.

Optical parametric devices are described in U.S. Pat. Nos. 3,371.220; 3,530,301; and 3,537,020.

A present invention optical device can be achieved by constructing one of the optical devices described in the technical literature, except that a present invention polymer medium is utilized as the nonlinear optical component.

SYNTHESIS OF MONOMERS AND POLYMERS

An aniline compound which is para-substituted with an acceptor group is synthesized if not commercially available. The para-substituted aniline is diazotized, and coupled with an appropriate hydroxyalkyl-substituted aromatic amine to generate a hydroxyalkyl-substituted azostilbene. The azostilbene is esterified with an appropriate acryloyl chloride or anhydride to provide a monomer, and the monomer is copolymerized with an appropriate acrylate or alkylacrylate comonomer.

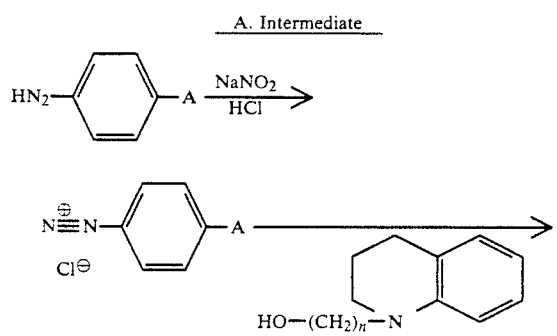

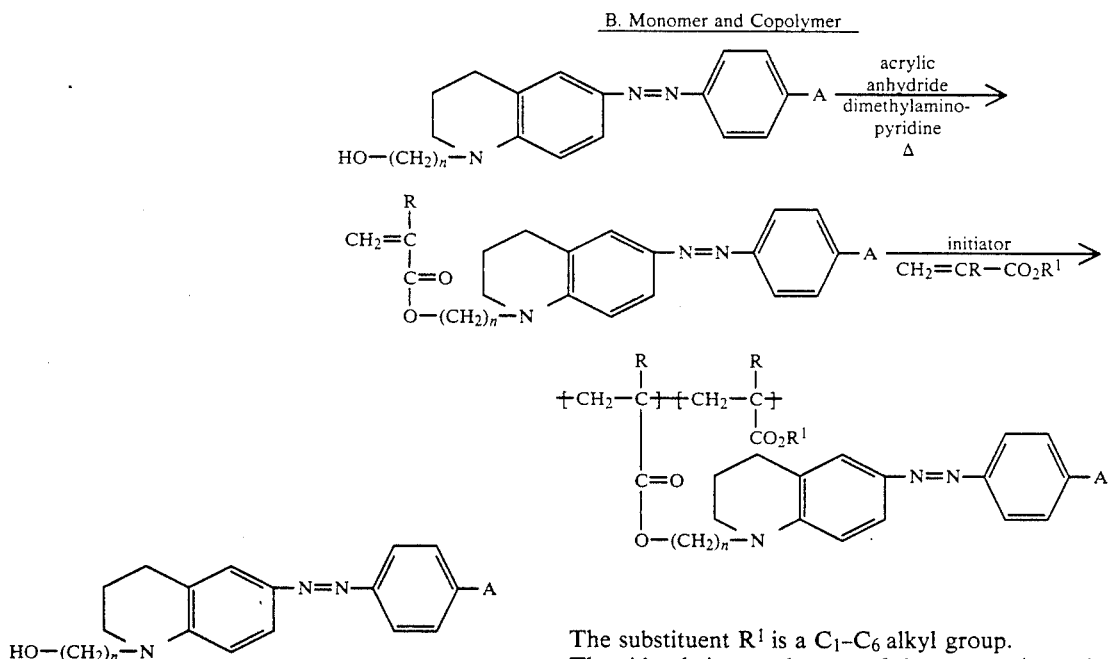

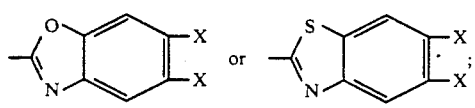

The substituent A is —CN, —NO$_2$, —CH=C(CN)$_2$, —C(CN)=C(CN)$_2$, —SO$_2$CF$_3$, and X is —H, —CN, —NO$_2$ or —CF$_3$.

Referring to the above reaction diagram, tetrahydroquinoline may be alkylated in methanol by adding excess bromoethanol, sodium iodide and potassium carbonate and refluxing the solution for 24 hours. The product is preferably isolated in water and purified by vacuum distillation. If phenylpiperazine is the starting material, it is alkylated under the same reaction conditions. A 1-phenyl-4-piperidinol structure is synthesized by preparing N-but-3-enyl—N-methylaniline, and treating with aqueous trifluoroacetic acid. N-but-3-enyl—N-methylaniline is provided by alkylation of N-methylaniline with 4-bromobut-1-ene. 1-Phenyl-3-pyrrolidinol is synthesized by the reaction of aniline with 1,4-dibromo-2-butanol.

With respect to the electron-withdrawing group as represented by -A in the above reaction diagram, 4-dicyanovinylaniline is prepared by condensation of 4-aminobenzaldehyde with malonitrile. The 4-dicyanovinylaniline is coverted to 4-tricyanovinylaniline by the addition of hydrogen cyanide and oxidation with lead(IV) oxide.

The triflone derivative of aniline is prepared by sulfonylation of a protected aniline with trifluoromethanesulfonic anhydride in the presence of a Lewis acid such as aluminum trichloride.

Similar synthesis procedures are followed with appropriate starting materials to provide structures where the -A substituent is a benzoxazole or benzthiazole group. For structures where the -A substituent is a cyano or nitro group, commercially available 4-aminobenzonitrile and 4-nitroaniline respectively are used as starting materials.

The substituent R$^1$ is a C$_1$-C$_6$ alkyl group.

The side chain copolymers of the present invention have a unique combination of physical and optical properties.

The azostilbene electronic structure in conjugation with electron-donating and electron-withdrawing substituents exhibits exceptional nonlinear optical susceptibility, e.g., an azostilbene-containing pendant side chain normally will exhibit a higher level of $\beta$ response than the closely related stilbene-containing structure in conjugation with comparable electron-donating and electron-withdrawing substituents. The azo bridge contributes to an enhancement of molecular nonlinear optical susceptibility by functioning as a strong electron withdrawing group. In a stilbene structure, the double bond is a relatively passive conduit for electron flow between the electron-donor and electron-withdrawing groups.

As a further advantage the azostilbene structure is more easily synthesized than the corresponding stilbene structure, and the azostilbene moiety has excellent thermal, photochemical and hydrolytic stabilities.

An additional enhancement of molecular nonlinear optical susceptibility is contributed by the amino electron-donating group which is contained in an alicyclic structure. It has been found that an alicyclic amino group because of steric factors is a superior electron-donating group for purposes of increasing molecular nonlinear optical susceptibility than is a corresponding acyclic amino group in a conjugated electronic system.

Among the different cycloamine structures represented in the present invention side chain copolymers, the tetrahydroquinoline structure is particularly preferred. Copolymers with tetrahydroquinoline-containing pendant side chains exhibit a superior combination of desirable properties, such as enhanced nonlinear optical susceptibility, increased poled molecular stability, increased solubility in organic solvents, and a lower glass transition temperature (e.g., 80°-120° C.) which improves tractability and facilitates processing procedures.

A present invention side chain copolymer in the form of a waveguiding medium has particular advantage in comparison with a medium of a liquid crystalline side chain polymer. A present invention optical medium exhibits exceptional optical transparency, while a liquid crystalline medium exhibits a light scattering effect because of deviation from ideal crystalline order. The efficiency of light transmission in an optical waveguide is diminished by light scattering.

The following examples are further illustrative of the present invention. The components and specific ingredients are presented as being typical, and various modifications can be derived in view of the foregoing disclosure within the scope of the invention.

EXAMPLE I

This Example illustrates the preparation of an isotropic copolymer (50/50) in accordance with the present invention.

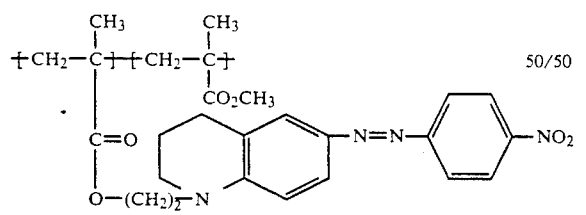

1,2,3,4-Tetrahydroquinoline (0.5 mole), 2-bromo-1-ethanol (2.5 moles), 250-500 ml of methanol and sodium carbonate (0.25 mole) are added to a flask fitted with a mechanical stirrer and condenser. The mixture is warmed to 80° C. for 16 hours, cooled to room temperature, and filtered to remove the solids The filtrate is extracted with ether, and the ether is removed by rotary evaporation. The residue is vacuum distilled and separated into two fractions. The first fraction is excess bromoethanol (56°-57° C., 20 mm Hg). The second fraction is 1-(2-hydroxyethyl)-1,2,3,4-tetrahydroquinoline (110°-120° C., 0.4 mm Hg), in a 60% yield.

4-Nitroaniline (0.25 mole) is added to an aqueous solution of hydrochloric acid (10% v/v) which has been cooled to 0° C. in an ice bath. Acetic acid (300 ml) is added to increase the solubility of the aniline. One equivalent of sodium nitrite is added to the aniline solution, while keeping the temperature below 10° C.

The 1-(2-hydroxyethyl)-1,2,3,4-tetrahydroquinoline (0.25 mole) is added directly to the diazonium salt solution and kept below 10° C. The pH is adjusted to 4 by adding sodium acetate. The ice bath is removed and the mixture is stirred for 3 hours at room temperature. The 1-(2-hydroxyethyl)-6-(4'-nitrophenylazo)-1,2,3,4-tetrahydroquinoline is precipitated into water, isolated, and washed with water. The yield is 60%.

The 1-(2-hydroxyethyl)-6-(4'-nitrophenylazo)-1,2,3,4-tetrahydroquinoline product (0.15 mole), dimethylaminopyridine (0.03 mole) and toluene are added to a dried flask fitted with an addition funnel, nitrogen bubbler, thermometer, and mechanical stirrer. The mixture under nitrogen is warmed to 75° C. in a thermostated oil bath. Acrylic anhydride (0.38 mole) which has been previously distilled is added slowly via the addition funnel. The solution is kept at 75° C. for 16 hours. The solution is cooled to room temperature and washed with aqueous sodium hydride. The toluene solution is dried over magnesium sulfate. The monomer is precipitated by the addition of hexane (60% yield).

The NLO-active monomer (0.1 mole, 39.44 g) is copolymerized with methyl methacrylate (0.1 mole) in 500 ml dried and purified dimethylsulfoxide with one mole% azobis(isobutyronitrile) (AIBN) under nitrogen. The monomers, solvent, and AIBN initiator are added to a round bottom flask, covered with a septum, and degassed by bubbling nitrogen for 15 minutes. The nitrogen is changed to a sparge and the flask is warmed to 75° C., and a positive nitrogen pressure is maintained in the flask. The monomers are polymerized for 12 hours at 75° C. The copolymer product is precipitated into methanol and isolated by filtration (90% conversion).

The copolymer has a $T_g$ of about 112° C., and exhibits a $\beta$ of about $180 \times 10^{-30}$ esu as measured at 1.34 $\mu$m excitation wavelength.

EXAMPLE II

This Example illustrates the preparation of an isotropic copolymer (75/25) in accordance with the present invention.

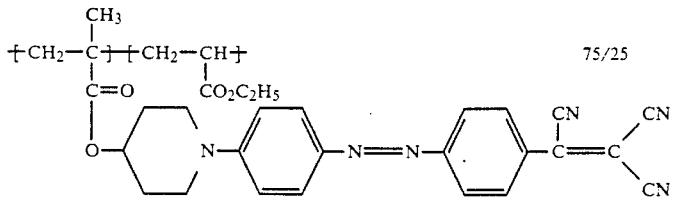

N-but-3-enyl—N-methylaniline is prepared by heating a mixture of N-methylaniline (0.75 mole), 4-bromobut-1-ene (1.0 mole), sodium carbonate (0.6 mole), ethanol (300 ml), and water (30 ml) under reflux for 20 hours. The solvent is removed by rotary evaporation, and the residue is basified with aqueous sodium hydroxide. The N-but-3-enyl—N-methylaniline product is extracted with methylene chloride and distilled (114° C., 12 mm Hg) to provide a 65% yield. Treatment of the product with trifluoroacetic acid affords 1-phenyl-4-piperidinol (50% yield).

4-Aminobenzaldehyde (0.3 mole), malonitrile (0.3 mole), 4 liters of ethanol, and piperidine (0.075 mole) catalyst are stirred together for one hour in a flask cooled in an ice water bath. The ice bath is removed and stirring is continued at room temperature for an additional 12 hours. The reaction mixture is added to 3 liters of water and the solids are filtered. The crude 4-dicyanovinylaniline product is dissolved in ethanol and hot filtered. Water is added to the hot filtrate, and the product crystallizes upon cooling and is isolated by filtration. The reaction yield is 78% (mp 214°–215° C.).

4-Dicyanovinylaniline (0.1 mole) is dissolved in 250 ml of dimethylformamide in a round bottom flask. A 30% excess of 4 M sodium cyanide is added dropwise with stirring. Acetic acid (300 ml) and lead oxide (0.1 mole) are added successively, and the color changes from orange to red. The mixture is stirred for 3 hours and poured into ice water with stirring. The precipitated crude product is filtered, recrystallized from acetic acid, isolated by filtration, and dried. The 4-tricyanovinylaniline is deep red. The yield is 92% (mp 199°–202° C.).

The 4-tricyanovinylaniline is diazotized in a manner similar to the diazotization in Example I. 4-Tricyanovinylaniline is added to an aqueous solution of hydrochloric acid (10% v/v) which is cooled in an ice bath to 0° C. Acetic acid (300 ml) is added to increase the solubility of the aniline. One equivalent of sodium nitrite is added to the aniline solution, while keeping the temperature below 5° C.

The 4-tricyanovinylbenzenediazonium salt is coupled with 1-phenyl-4-piperidinol in a manner similar to the coupling in Example I. 1-Phenyl-4-piperidinol is mixed with dilute acetic acid and cooled to 0° C. in an ice bath, and the diazonium salt solution is added. The pH is adjusted to 4 with saturated sodium acetate solution. The ice bath is removed and the mixture is stirred for 16 hours at room temperature. The 4-(4-hydroxy-1-piperidyl)-4'-(2-(1,1,2-tricyano)ethen)azobenzene product is precipitated into water, isolated, and washed with water.

The azostilbene product (0.15 mole), dimethylaminopyridine (0.03 mole), and 300 ml of dried and distilled pyridine is added to a dried flask fitted with an addition funnel, nitrogen bubbler, thermometer, and mechanical stirrer. The mixture under nitrogen is warmed to 75° C. in a thermostated oil bath. Methacrylic anhydride (0.38 mole) which had been previously distilled is added slowly via the addition funnel. The solution is kept at 75° C. for 16 hours. The solution is cooled to room temperature, and poured into one liter of distilled water. The precipitated monomer is isolated by filtration, and washed with an additional liter of water. The crude monomer is washed with hexane, and purified by recrystallization from tetrahydrofuran.

The NLO-active monomer (33.71 g, 0.075 mole), ethyl acrylate (0.025 mole), 400 ml of 1,2-dichloroethane, and one mole % azobis(isobutyronitrile) are added to a round bottom flask, and covered with a septum. The copolymerization is conducted in a manner similar to Example I. The copolymer product is precipitated into methanol and isolated by filtration (90% conversion).

The copolymer has a $T_g$ of about 110° C., and exhibits a $\beta$ of about $165 \times 10^{-30}$ esu as measured at 1.34 $\mu$m excitation wavelength.

Similar procedures are followed to produce copolymers (75/25) with the same type of copolymeric structures, except that the electron-withdrawing group in the azostilbene side chain of the NLO-active monomer is a benzthiazole or benzoxazole 4'-substituent instead of a tricyanovinyl 4'-substituent.

EXAMPLE III

This Example illustrates the preparation of an isotropic copolymer (25/75) in accordance with the present invention.

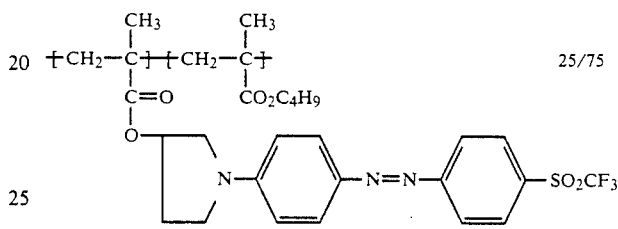

25/75

Aniline (2 moles) is heated to reflux in a flask fitted with a mechanical stirrer, condenser, addition funnel, and thermometer. 1,4-Dibromo-2-butanol (4 moles) is added dropwise, and the mixture is refluxed for 2 hours after the addition is completed. The reaction mixture is cooled and ml of water are added. The solution is acidified with hydrochloric acid, cooled, and extracted with ether. The aqueous layer is basified with aqueous sodium hydroxide, saturated with potassium carbonate and extracted with chloroform. The chloroform is evaporated and the 1-phenyl-3-pyrrolidinol product is distilled (200° C., 10 mm Hg) to provide a 68% yield.

Trifluoromethanesulfonic anhydride (0.3 mole) is added slowly to a flask containing a mixture of acetanilide (34 g, 0.25 mole) and dichloromethane which is cooled in an ice bath. The flask is fitted with a stirrer, condenser, and argon inlet. The mixture is warmed to room temperature and stirred for 24 hours. A small amount of water is added to remove any unreacted trifluoromethanesulfonic anhydride. Additional methylene chloride is added, and the mixture is washed with water, aqueous base, and a final water wash. The methylene chloride volume is reduced by rotary evaporation and the 4-triflylaniline product is recrystallized from methanol (30% yield).

4-Trifluoromethanesulfonylaniline (0.1 mole) is added to an aqueous solution of sulfuric acid (10% v/v) which is cooled in an ice bath. One equivalent of sodium nitrite is added to the aniline solution, while keeping the temperature below 5° C. Saturated sodium hydroxide solution is added to adjust the pH from 2 to 4, and 4-trifluoromethanesulfonylbenzenediazonium hydrogensulfate precipitates. The product mixture is refrigerated.

The coupling of 4-trifluoromethanesulfonylbenzenediazonium hydrogensulfate and 1-phenyl-3 pyrrolidinol is accomplished in the manner of Example I. 1-Phenyl-3-pyrrolidinol (0.1 mole) is dissolved in dilute acetic acid and cooled to 0° C. in an ice bath. The diazonium salt solution is added, and the pH is adjusted to 4 with saturated sodium hydroxide solution. The ice bath is removed and the mixture is stirred for 16 hours. The azostilbene product is precipitated into water, isolated, and washed with water (65% yield).

The azostilbene compound is esterified with methacrylic anhydride to produce an NLO-active monomer in the manner described in Example I. The azostilbene (0.15 mole), dimethylaminopyridine (0.03 mole), and 300 m¹ of dried and distilled pyridine are added to a dried flask fitted with an addition funnel, nitrogen bubbler, thermometer, and mechanical stirrer. The mixture under nitrogen is warmed to 75° C. in a thermostated oil bath. Methacrylic anhydride (0.38 mole) is added slowly via the addition funnel. The solution is maintained at 75° C. for 16 hours. The solution then is cooled to room temperature and poured into one liter of distilled water. The precipitated monomer is isolated by filtration and washed with an additional liter of water. The crude monomer is washed with hexane and purified by recrystallization from tetrahydrofuran (78% yield).

The NLO-active monomer (0.1 mole), purified butyl methacrylate (0.3 mole), 400 m¹ of 1,2-dichloroethane, and one mole % of azobis(isobutyronitrile) are charged to a round bottom flask and covered with a septum. The copolymerization is conducted in accordance with the procedure of Example I. The copolymer is precipitated into methanol and isolated by filtration (90% conversion).

The copolymer has a $T_g$ of about 60° C., and exhibits a $\beta$ of about $155 \times 10^{-30}$ esu as measured at 1.34 μm excitation wavelength.

EXAMPLE IV

This Example illustrates the construction and operation of an optical frequency converting waveguide module in accordance with the present invention.

A silicon dioxide-coated silicon wafer with a grating electrode is constructed by means of the following fabrication procedures.

A commercially available silicon dioxide-coated silicon wafer is placed in a Varian electron beam vacuum deposition system. A 0.1 μm layer of 99.999% purity aluminum is deposited on the wafer.

AZ-1518 positive photoresist (Hoechst) is spin-coated on the aluminum-coated wafer with a Solitec model 5100 coater. A 1 5 μm photoresist coating is achieved by spinning at 5000 rpm for 30 seconds. The photoresist coating is dried in a vacuum oven at 90° C. for 30 minutes.

The photoresist coating is patterned by placing the wafer in contact with a mask of the desired configuration in a Karl Suss model MJB3 mask aligner, and exposing the masked coating to 405 μm radiation (70 mJ/cm²).

The mask is removed, and a thin piece of silicon (1 cm×2 cm) is placed on the surface of the patterned photoresist as a protective shield, and the combination is exposed to 70 mJ/cm² of 405 μm radiation. The patterned photoresist is developed with AZ Developer in water (1:1) over a period of 60 seconds, and the developing cycle is terminated by washing with deionized water.

The photoresist-coating of the wafer is baked in a vacuum oven at 120° C. for 45 minutes. The exposed aluminum pattern is etched with type A etchant (Transene Corp.) at 50° C. for 20 seconds, and the etched surface is rinsed with deionized water.

The aluminum grating electrode surface of the wafer then is covered with a 1.5 μm cladding layer of 20% polyvinyl alcohol (75% hydrolyzed) in water by spin-coating at 5000 rpm for 30 seconds, and the cladding layer is dried in a vacuum oven at 110° C. for two hours.

A nonlinear optically active layer of 1.65 μm thickness is spin-coated on the cladding layer at 3000 rpm. The spin-coating medium is a 20% solution of the Example I copolymer (50/50) of side chain monomer/ethyl methacrylate in trichloropropane. The organic layer is dried in a vacuum oven at 160° C. for one hour.

An upper cladding layer of 1.5 μm thickness is added by spin-coating a medium of polysiloxane (GR-651-L, Owens-Illinois Inc., 25% solids in 1-butanol) at 3500 rpm for 30 seconds. The cladding layer is dried in a vacuum oven at 100° C. for 35 minutes. A 0.055 μm coating of aluminum is deposited as an electrode layer on the upper cladding layer.

The fabricated waveguide is placed in a Mettler hot stage, and the unit is raised to 90° C. at 1° C./min. A DC field of 70 V/μm is applied across the waveguiding organic layer for ten minutes by means of the electrodes. The electric field is maintained while the waveguide sample is cooled to room temperature at 1° C./min. The $\chi^{(2)}$ nonlinear optical response of the waveguiding medium is $3 \times 10^{-8}$ esu as measured at 1.34 μm excitation wavelength.

The waveguide structure is cleaved at opposite ends to provide two sharp faces to couple light in and out of the waveguiding organic layer.

Cylindrical lens are employed to focus and couple 1.34 radiation (0.01 mJ, 10 nsec wide pulse) into the waveguide. The waveguide is situated on a rotation stage, and phase-matched second harmonic generation is observed when the waveguide is rotated until the periodicity satisfies the value for phase-matching. Under the described operating conditions, a 0.5-1% amount of the fundamental beam is converted into an observed second harmonic radiation.

What is claimed is:

1. An isotropic acrylic copolymer which is characterized by recurring monomeric units corresponding to the formula:

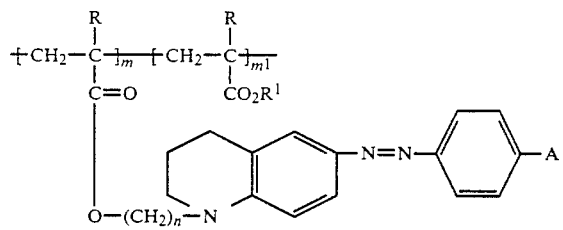

where R is hydrogen or a $C_1$-$C_4$ alkyl substituent; $R^1$ is a $C_1$-$C_6$ alkyl substituent; m and m are integers which total at least 10; n is an integer between about 1-20; and A is —CN, —NO , —CH=C(CN)$_2$, —C(CN)=C(CN)$_2$, —SO$_2$CF$_3$,

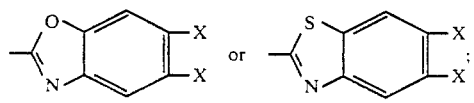

and X is —H, —CN, —NO$_2$ or —CF$_3$.

2. An acrylic copolymer in accordance with claim 1 which has a weight average molecular weight in the range between about 5000-200,000.

3. An acrylic copolymer in accordance with claim 1 which has a glass transition temperature in the range between about 40°-150° C.

4. An isotropic acrylic copolymer which is characterized by recurring monomeric units corresponding to the formula:

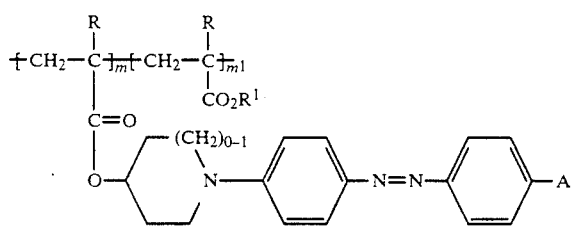

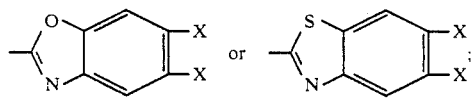

where R is hydrogen or a $C_1$-$C_4$ alkyl substituent; $R^1$ is a $C_1$-$C_6$ alkyl substituent; m and $m^1$ are integers which total at least 10; and A is —CN, —NO$_2$, —CH=C(CN)$_2$, —C(CN)=C(CN)$_2$, —SO$_2$CF$_3$, and X is —H, —CN, —NO$_2$ or —CF$_3$.

5. An acrylic copolymer in accordance with claim 4 which has a weight average molecular weight in the range between about 5000-200,000.

6. An acrylic copolymer in accordance with claim 4 which has a glass transition temperature in the range between about 40°-150° C.

7. An isotropic acrylic copolymer which is characterized by recurring monomeric units corresponding to the formula:

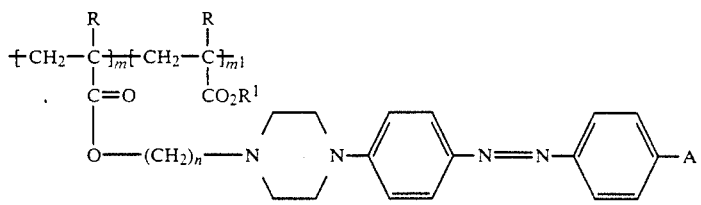

where R is hydrogen or a $C_1$-$C_4$ alkyl substituent; $R^1$ is a $C_1$-$C_6$ alkyl substituent; m and $m^1$ are integers which total at least 10; n is an integer between about 1-20; and A is —CN, —NO$_2$, —CH=C(CN)$_2$, —C(CN)=C(CN)$_2$, —SO$_2$CF$_3$,

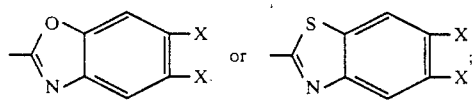

and X is —H, —CN, —NO$_2$ or —CF$_3$.

8. An acrylic copolymer in accordance with claim 7 which has a weight average molecular weight in the range between about 5000-200,000.

9. An acrylic copolymer in accordance with claim 7 which has a glass transition temperature in the range between about 40°14 150° C.

* * * * *

UNITED STATES PATENT AND TRADEMARK OFFICE
CERTIFICATE OF CORRECTION

PATENT NO. : 5,041,509

DATED : August 20, 1991

INVENTOR(S) : C. Lee et al

It is certified that error appears in the above-identified patent and that said Letters Patent is hereby corrected as shown below:

In the abstract at [57], please delete the structure and replace with the following structure:

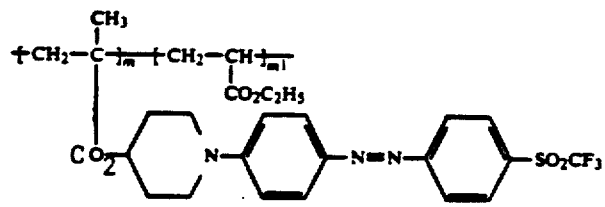

Signed and Sealed this

Ninth Day of March, 1993

*Attest:*

STEPHEN G. KUNIN

*Attesting Officer*     *Acting Commissioner of Patents and Trademarks*